United States Patent [19]
Caen

[11] 3,764,890
[45] Oct. 9, 1973

[54] APPARATUS FOR CONTROLLING POWER TRANSMITTED BY A GROUP OF N PHASE CONDUCTORS

[75] Inventor: Claude Nephtale Caen, Saint-Cloud, France

[73] Assignee: Societe Anonyme Francaise Du Ferodo, Paris, France

[22] Filed: Jan. 17, 1972

[21] Appl. No.: 218,275

[30] Foreign Application Priority Data
Jan. 15, 1971 France .................... 7101242

[52] U.S. Cl. ............ 323/24, 307/133, 307/252 UA, 307/269, 307/297, 323/25, 323/34
[51] Int. Cl. ............................... G05f 1/44
[58] Field of Search ............... 323/22 SC, 24, 25, 323/34, 35, 36, 38; 307/104, 133, 252 UA, 269, 265, 266, 267, 268, 297; 321/16, 18, 21, 24

[56] References Cited
UNITED STATES PATENTS

| | | | |
|---|---|---|---|
| 3,671,849 | 6/1972 | Kingston ............................. | 323/24 |
| 3,577,177 | 5/1971 | Hewlett, Jr. ..................... | 323/22 SC |
| 3,560,860 | 2/1971 | Gueldenpfenning ............ | 307/269 X |
| 3,663,950 | 5/1972 | Bartlett ......................... | 307/252 UA |
| 3,667,030 | 5/1972 | Gordon et al. .................. | 307/133 X |

FOREIGN PATENTS OR APPLICATIONS
1,927,301  0/1970  Germany ............................. 323/2 S Primary Examiner—Gerald Goldberg
Attorney—Irvin S. Thompson et al.

[57] ABSTRACT

An apparatus for controlling the electric power transmitted by a group of N phase conductors supplied with N-phase alternating current, by means of controlled thyristors operative during substantially full half-periods, each of said thyristors being series connected with a respective one of said conductors and being adapted to receive a firing pulse conditioned by the transmission of a synchronizing pulse delivered in each period of said alternating current at zero crossings of the supply voltage of the corresponding phase conductor.

The described apparatus is intended to bring the mean value of the voltage to zero at any two of the load terminals by producing successive cycles comprising N trains of consecutive conductive half-periods in which the first half-period of each of the N trains corresponds in turn with the triggering of a different one of the N thyristors.

10 Claims, 1 Drawing Figure

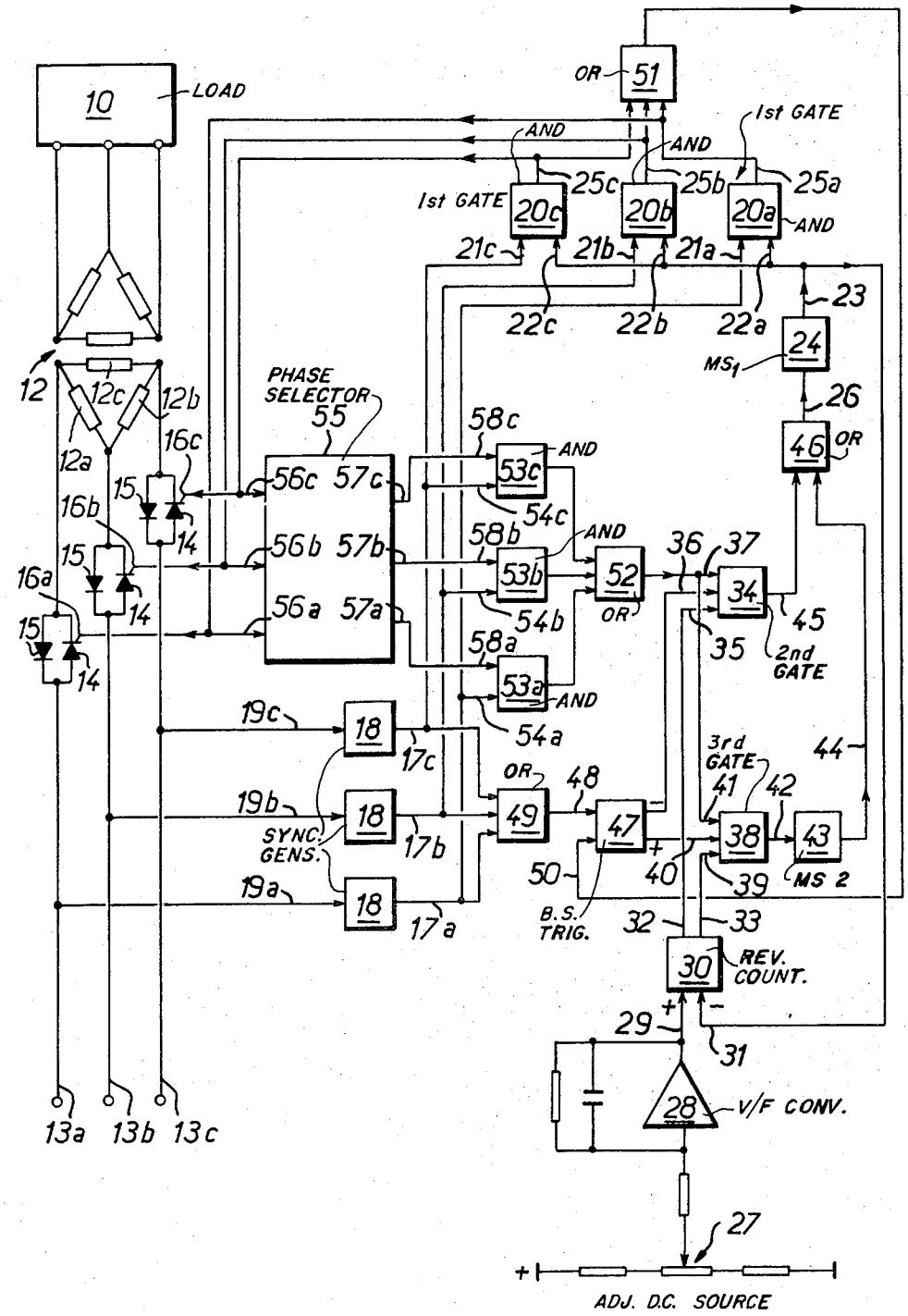

APPARATUS FOR CONTROLLING POWER TRANSMITTED BY A GROUP OF N PHASE CONDUCTORS

The present invention relates to controlling electric power supplying a polyphase electro-magnetic load by means of thyristors operative during full waves.

A known method of controlling electrical power by thyristors known as the full wave or half-wave type, consists in varying the "working rate" of the thyristors, i.e. the ratio of the time during which the thyristors are conductive and apply the supply voltage to the load circuit versus the total operating time. This designation originates in the fact that the thyristors are preferably, but not necessarily, rendered conductive during full periods or full half-periods of the alternating supply voltage.

When the power controlled by such a full wave system, is transmitted through an electro-magnetic load apparatus (transformer, motor, etc,) disposed between the thyristor unit and the load apparatus, difficulties appear, especially in connection with the saturation and the size to be given to the magnetic circuits.

The saturation of the magnetic circuits is in fact disadvantageous, especially for the thyristors, because it is accompanied by large magnetizing currents which may be several times the value of the effective current. These magnetizing currents may thus cause overloads which are unacceptable, especially for the thyristors.

At the moment the current is applied to the apparatus, it is known (see T.A. PENKALSKI "Some common problems when using power semiconductors", Publ. General Electric Co.) that there is a risk of saturation of the magnetic circuits.

This problem appears both in monophase and polyphase circuits. One of the known ways for eliminating this problem consists, when current starts flowing through the thyristors, in bringing the thyristors into conduction only progressively by full periods or full half-periods.

In polyphase circuits, it may be possible to cause the various phases to operate in the same way as a corresponding plurality of independent monophase circuits, thus making it possible to solve the above problems by utilizing known methods dealing with monophase currents.

If, on the other hand, an electric coupling (absence of neutral point or neutral point not connected to the load circuit, for example) or a magnetic coupling (polyphase transformer or polyphase motor for example) exists between the various phases, additional disturbances may occur.

In fact, operation by full waves, as previously described, is effected by a succession of wave-trains, in which the voltage, the duration and the time intervals are variable.

Though the transitions corresponding to the beginning of the wave trains may be simultaneous for the various phases in certain known power control devices, it is not possible to have the corresponding wave train end transitions coincide.

During the intervals between the transitions, the phases of the load circuit which are not effectively connected, nevertheless receive a certain supply voltage by electrical or magnetic coupling with the phases which are connected.

These "edge effects" are disadvantageous in two ways:

In fact, the voltage which is added to that of an ideal wave-train (such as exists in monophase) has a mean value which is not necessarily zero;

In addition, by the possible successive of half-waves or fractions of half-waves of the same sign, the peak-to-peak variation of the flux in the magnetic circuit is increased with respect to the value obtained under continuous conditions. This situation is generally further aggravated in the case of an unbalanced load.

The effect of this increase in the variation of magnetic flux can be attenuated by increasing the size of the magnetic circuit. On the other hand, a voltage having a means value other than zero cannot be employed for the supply of an electro-magnetic apparatus, because it will cause saturation of the magnetic circuit at the end of a certain time, irrespective of the magnetic circuit size.

Having in mind the object of solving the above discussed problems in N-phase systems, wherein N, the number of the phase conductors, is any integer greater than TWO for supplying a load with N-phase alternating current, comprising a thyristor arranged in series with each one of said conductors for being made conductive during substantially full half-periods of said alternating current, means for generating synchronizing pulses to be produced for each period of said alternating current at substantially zero crossings of the supply voltage of each phase conductor, switching means for the supply voltage of each phase conductor, switching means for processing firing pulses derived from said synchronizing pulses so that said firing pulses render the corresponding thyristors conductive during substantially half periods of said alternating current, said switching means being adapted to process said firing pulses so as to produce conduction cycles consisting of N trains of conductive half-periods, each of said trains consisting of $a + Nb$ half-periods having the same sign, $a$ being an invariable positive whole number and $b$ being a positive whole number or zero, the successive half-periods of each train being determined in response to consecutive synchronizing pulses, and phase selecting means adapted to cause the first half-period of a train of half-periods of said cycle to pass through each thyristor once and only once during the course of each of said cycles.

It is possible to arrange the time distribution of the firing pulses applied to the various thyristors in such manner that the mean value of the output voltage on each terminal of the load is substantially zero for each cycle of N trains of conductive half-cycles, and the proposed apparatus allows to a certain extent a time symmetrization of the operation of the overall arrangement.

During the passage of a train of consecutive conductive half-cycles, the choice of the initial conductive half-cycle of the train which corresponds to a synchronizing pulse coming from one of the phase conductors and conditionally transmitted to the thyristor associated with this conductor, determines the order in which the thyristors are successively energized for transmitting in turn the successive conductive half-periods of this train; the choice of the first thyristor to be energized determines in particular the thyristor through which the last conductive half-period of the train passes, under the sole condition that the number of half-periods of the train is in the form $a + Nb$, where $a$ is a pre-determined fixed invariable whole number, $b$ any whole number, including zero, and N the number of phases.

In order to effect the time symmetrization referred to above, it is therefore only necessary that each of the thyristors should be traversed by the current during the course of one cycle by the first conductive half-period of one of the N trains of the cycle.

According to a further feature of the invention, the firing order of the thyristors through which the initial conductive half-period of each train successively passes is in inverse order to the order of the phase conductors corresponding to the increasing relative phase lag of their respective supply voltage. This enables the best time distribution of power passing through each of the N phase conductors, by minimizing the magnetic stresses on the supplied load, for example transformers.

For a certain value of the whole number $a$ and a particular succession order the thyristors which are traversed by the initial conductive half-period of each of the N consecutive trains of the cycle, it may be considered that ordered rank (defined as above as a function of the phase angle of the associated phase conductor) of the thyristor which has been traversed by the final half-period of a train having a given time position in the cycle determines the rank of the thyristor which is to be fired for transmitting the initial conductive half-period of the next following train, which permits the choice of the last mentioned thyristor to be made sequentially, for example by means of the firing pulse of the first mentioned thyristor.

The invention thus proposes an apparatus enabling the various aspects referred to above to be advantageously carried into effect, the apparatus comprising a first gating means adapted to transmit conditionally the synchronizing pulses coming from each phase conductor, in order to fire a respective thyristor associated with the said conductor, a mono-stable circuit having low and high state and adapted to allow in its high state, the transmission of the said synchronizing pulses by the said first gating means, the time-constant of the said mono-stable circuit being such that the transition of the said mono-stable circuit to its high state enables the said first conditioning device to transmit a train of a consecutive synchronizing pulses for causing the firing of the corresponding thyristors and the transmission by of these thyristors of a corresponding train of $a$ consecutive conductive half-periods, a voltage-to-frequency converter delivering power-demand pulses, the frequency of which is an increasing function of a direct-current voltage adjustable between two pre-determined limits, a reversible counter which counts additively the demand pulses supplied by the said converter and subtractively the state changes of the said monostable circuit from its low state to its high state, a second gating means adapted to transmit conditionally to the said mono-stable circuit an energizing pulse in response to an initiating synchronizing pulse coming from a sequentially pre-determined phase conductor, on condition that the count stored in the said reversible counter equals at least ONE and that the synchronizing pulse immediately preceding the said energization pulse has not caused the corresponding thyristor to be fired, and a phase selector adapted to transmit selectively to the said second gating means a synchronizing pulse coming from one of the said sequentially determined N phase conductors for each energization pulse of the said mono-stable circuit, as a function of the succession rank of the train of conductive half-periods initiated by the said energization pulse in the cycle to which the said train belongs.

When the number of conductive half-periods of each train is the whole number $a$ as defined above, the adjustment of the power transmitted is effected by varying the number of non-conductive half-periods separating the conductive half-periods of two consecutive trains of half-periods. Over the length of a train or a cycle, the variation of power is therefore effected by discrete values and this variation is effected in steps which become shorter as the mean power demanded becomes greater.

In order to maintain progressive power adjustment up to full power, the invention further provides for the division of the total adjustment range of the transmitted power into sub-ranges each corresponding to a pre-determined respective value of the whole number $b$ as defined above.

For example, there can be taken $b = 0$ in a sub-range corresponding to small power demands, and then $b$ can be given a higher value in a sub-range corresponding to a higher power, and so on up to the maximum power corresponding to a 100 percent working rate of the thyristors, for which $b$ would be infinity.

Accordingly to another feature of the invention, there is provided for a limitation of the increase of the peak-to-peak value of the induction in the magnetic circuits during the progressive return of the maximum induction towards the remanent induction when the time of rest (non-conductive half-periods) between two successive trains of half-periods becomes too long. To this end, a lower limit of the working rate of the thyristors is imposed.

It will furthermore be sought to reduce the increase of the instantaneous value of the magnetic induction at the beginning of the train of conductive half-periods following a longer train whose length is large enough to creat conditions comparable to continuous operation. In fact, during the course of a long train of half-periods, the hysteresis cycle of the magnetic circuits tends spontaneously to be centered at about a zero mean value of the magnetic induction under continuous conditions, which generally causes an undesirable excess in the maximum permissible induction at the beginning of a new train of half-periods. In this connection, an upper limit may be fixed for the working rate, which limit may be chosen slightly below 100 percent.

Other features and advantages of the invention will become apparent from the following description of a preferred embodiment of the invention. The description refers to the accompanying drawing which shows a block diagram of a power controlling apparatus according to the invention, intended to operate on three-phase current.

As can be seen with reference to the drawing, the device which is shown diagrammatically is intended to control the electric power supplied to a load 10 coupled by a transformer 12 to the three phase conductors 13a, 13b and 13c (the corresponding phase angles being assumed to follow each other in that order) of a supply system with three-phase alternating current at 60 H2. The primary windings 12a, 12b and 12c of the transformer 12 are advantageously connected in delta, and each of the apices of the delta is connected to a phase conductor by means of a conventional circuit comprising a thyristor 14 associated with an inverse diode 15.

The adjustment of the power supplied to the load 10 is effected by controlling the conduction of each of the thyristors by means of their trigger electrodes 16a, 16b, 16c respectively, each of which is capable of receiving conditionally a synchronizing pulse available at the respective outputs 17a, 17b and 17c of synchronizing signal generating circuits 18, of which the respective inputs 19a, 19b and 19c are coupled to the phase conductors 13a, 13b and 13c.

The circuits 18 are adapted to supply a short pulse during the positive going zero crossings of their input voltage. They thus supply each of the pulses at the frequency of 60 H2, and the pulses supplied by the three circuits 18 are mutually spaced in correspondence with the $2\pi/3$ phase difference of their respective input voltages.

The outputs 17a, 17b and 17c are respectively connected to the trigger electrodes 16a, 16b and 16c through the intermediary of a first gating device comprising three AND gates 20a, 20b and 20c, each having two inputs. For that purpose, their respective inputs 21a, 21b and 21c are connected to the respective outputs 17a, 17b and 17c of the synchronizing circuits 18, their respective inputs 22a, 22b and 22c being all three connected to the output 23 of a monostable trigger, the time-constant of which is about 8.33 milliseconds, and their outputs are respectively connected (through respective amplifiers if necessary) to the corresponding intermediary of amplifiers (not shown), to the corresponding trigger electrodes 16a, 16b and 16c of the thyristors 14.

When the input 26 of the monostable 24 receives an energizing pulse, it switches into its high state and thus opens the gates 20a, 20b and 20c for a period corresponding to its time-constant, while permitting the firing of the thyristors by the synchronizing pulses appearing during this time interval at the input of the AND gates. The working rate of the thyristors, and therefore the electrical power transmitted to the load 10, thus depends directly on the frequency of switching of the monostable circuit 24.

The input 26 of the monostable 24 is connected to circuits which will now be described and which make it possible to effect the energizing as a function of work orders depending on the power demand, and as a function of the desired distribution of the firing pulses to the various thyristors in order to determine cycles of three trains of conductive half-periods.

Work orders are prepared from a variable D.C. source shown diagrammatically at 27, which is connected to the input of a voltage-frequency converter 28 at the output of which impulses are available having a frequency proportional to the voltage produced the source 27.

These pulses are applied to the direct counting input 29 of a reversible counter 30, in which the reverse counting input 31 is connected to the output 23 of the monostable circuit 24 in order to reduce by one unit the count C stored in the counter each time the monostable switches from its low state to its high state. The counter 30 has a first output 32 on which a step signal is available when the count C is equal to or greater than unity, and a second output 33 on which appears a step signal when the count C is equal to or greater than 3, in which case the step signal on output 32 is still available.

These signals are intended respectively to condition a second gating device constituted by an AND gate 34 with three inputs 35, 36 and 37, and a third gating device constituted by another AND gate 38 with three inputs 39, 40 and 41. The output 42 of the gate 38 is connected to the input of a second monostable trigger 43, the time-constant of which is about 29.16 milliseconds. The output 44 of this monostable and the output 45 of the AND gate 34 are connected via an OR gate 46 having two inputs to the input 26 of the first monostable 24. When the three inputs of the gate 34 are simultaneously excited, the input 26 of the monostable 24 is excited and this latter switches to its high state.

Similarly, when the three inputs of the AND gate 38 are excited, the monostable 43 passes into its high state and the signal then available on its output is capable of acting through the intermediary of the OR gate 46 to effect three successive trippings of the monostable 24, that is to say the execution of three work orders in succession. The AND gates 34 and 38 are never simultaneously conductive, in fact, since their respective inputs 36 and 40 are connected to two additional outputs of a bi-stable trigger 47. When the trigger 47 is in its state low or unexcited, the input 36 is high while the input 40 is low, and vice-versa when the trigger 47 is in its high state. The trigger 47 has a reset input 48 connected to the output of an OR gate 49, the three inputs of which are respectively connected to the outputs 17a, 17b and 17c of the synchronizing inpulse generators 18, and a triggering input 50 connected to the output of an OR gate 51, the three inputs of which are respectively connected to the outputs 25a, 25b, and 25c of the AND gates 20a, 20b and 20c, that is to say to the corresponding firing electrodes of the thyristors 14.

Thus, any synchronizing impulse transmitted by the first gating device to the firing electrode of the corresponding thyristor causes the transition of the bi-stable trigger 47 to its high state, and the following synchronizing pulse switches it back to its low state, unless this pulse also passes through the first gating device.

The respective inputs 37 and 41 of the gates 34 and 38 are both connected to the sequential switching device or phase selector, by means of which there can be applied a synchronizing pulse coming from a sequentially pre-determined synchronizing generators 18. To this end, the inputs 37 and 41 are connected to the output of an OR gate 52 having three inputs, each of which is connected to the output of one of three AND gates 53a, 53b and 53c with two inputs each, in which the first inputs 54a, 54b and 54c are respectively connected to the outputs 17a, 17b and 17c of the synchronizing inpulse generators 18.

The phase selector 55 in itself is intended to render conductive one of the three gates 53a, 53b and 53c as a function of the firing pulses of each of the thyristors 14. To this end, this phase selector has three inputs 56a, 56b and 56c, respectively connected to the firing electrodes 16a, 16b and 16c of the thyristors 14 and three outputs 57a, 57b and 57c respectively connected to the second inputs 58a, 58b and 58c of the three AND gates 53a, 53b and 53c, and its operation is as follows.

When the electrode 16a receives a firing starting pulse, the input 56a is excited, and a step signal is made available at the output 57b. When the input 56b is excited, the step signal previously present at the output 57b disappears and a step signal is available at the output 57c. Finally, the excitation of the input 56c causes the step signal previously present at 57c to cease and a step signal to appear at 57a.

The above described logic function of the selector 55 may be effected by entirely conventional means, for example by means of three bi-stable trigger devices and three OR gates, or even by means of electromechanical devices.

For the sake of the explanation of the operation of the above described apparatus, it being understood that the order of increasing phase-angle of the voltages at the terminals of the phase conductors is the order 13a, 13b, 13c, there will be chosen an initial state such that for example the bi-stable trigger device 47 is in its low state, the AND gate 53a is conductive, neither of the monostable triggers 24 and 43 is in its high state, these conditions corresponding for example to the completed passage of a cycle of trains of conductive half-periods.

It will further be assumed that the count C stored in the counter 30 is zero. Under these conditions, none of the gates 20a, 20b or 20c is conductive, and the synchronizing pulses cannot be transmitted to the firing electrodes of the thyristors. As the gate 53a is conductive, the synchronizing pulses corresponding to the conductor 13a pass through the OR gate 52 to the inputs 37 and 41 of the AND gates 34 and 38, but these two gates are both non conductive due to the fact that their respective inputs 35 and 39 are not excited (C = 0). No electric power is therefore transmitted by the thyristors to the load 10.

When a work order pulse generated by the converter 28 causes the counter 30 to move into the state C = 1, the AND gate 34, the inputs 35 and 36 of which are excited, becomes conductive, and an energizing signal appears at its output as soon as a signal appears at the output of the OR gate 52. The gates 53b and 53c still being non conductive, this signal is constituted by the synchronizing pulse from the conductor 13a which immediately follows the change of the counter 30 from the state C = 0 to the state C = 1. This synchronizing pulse passes through the AND gate 34 and the OR gate 46 and causes monostable 24 to change over to its high state, thereby producing at 23 a rectangular pulse for 8.33 milliseconds, and opening the three gates 20a, 20b and 20c.

This synchronizing pulse thus passes through the gate 20a and fires the thyristor arranged in series with the conductor 13a, which remains conductive during the entire corresponding half-period. However, the switching of the monostable has caused the subtraction through the input 31 of one unit from the count C of the counter 30 and, by means of the gates 20a and 51, the switching of the bi-stable trigger 47 to its high state, and also finally, via the input 56a and the associated output 57b of the phase selector 55, the closing of the gate 53a and the opening of the gate 53b; 5.555 milliseconds after the previous synchronization pulse, a fresh synchronizing pulse appears, this time at the output 17b of the generator 18 associated with the conductor 13b.

This second pulse passes through the gate 53b, but cannot re-energize the monostable 24, still excited, since the gate 34 has been closed by the switching of the trigger 47 into its high state. On the other hand, this second synchronizing pulse passes directly through the gate 20b, still open, and fires the thyristor associated with the conductor 13b and effects the transmission of a second conductive half-wave to the load 10. The firing of the thyristor in question results via the input 56b and the associated output 57c of the phase selector in closing the gate 53b and opening.

The next or third consecutive synchronizing pulse appears at the output 17c, 11.111 milliseconds after the first, that is to say after the return of the monostable 24 to its initial state. This pulse is transmitted to the input 21c and via the gates 53c and 52 to the inputs 37 and 41. As the monostable 24 has returned to its low state, the gate 20c is not conductive.

At the end of 8.333 milliseconds, the monostable 24 returns to its low state and the gates 20a, 20b and 20c close. The bi-stable trigger 47 is in its high state and the gate 34 is therefore closed 11.111 milliseconds after the assumed initial time, a synchronizing pulse appears at the output 17c of the generator 18 associated with the conductor 13c. The pulse cannot pass through the gate 20c which is closed; it arrives via the gates 53c and 52 at the respective inputs 37 and 41 of the gates 34 and 38.

If the power demand remains moderate, that is to say if the counter 30 has not received more than two new working orders, the gate 38 remains closed and this third synchronizing pulse cannot reach the input 26 and thus does not re-energize the monostable 24. Therefore, the corresponding half-period is not transmitted to the load 10 and the bi-stable trigger 47 returns to its low position. Then fourth and fifth successive synchronizing pulses appear respectively on the outputs 17a and 17b. The AND gates to which they are transmitted being closed, these pulses remain without effect on the thyristors.

When the sixth synchronizing pulse appears on the output 17c, it passes through the conductive gate 53c and, if the count C of the counter 30 is then at least equal to one, the gate 34 is conductive and permits the re-excitation of the monostable 24, which starts a new train of two conductive half-periods of the thyristors, after which the gate 53b is conductive so that, at the next following train, the thyristor to be fired is necessarily the one associated with the conductor 13b. At the end of the third train, the control apparatus has completed one entire cycle and returns to the condition chosen above as the initial state, except fo the state of the counter 30, which depends on the adjustment of the power demand, and will not necessarily be the same as at this the initial state.

It will now be assumed that the power demand is relatively high, that is to say the count C of the counter 30 reaches the FIG. three at certain moments, taking into account the 60 H2 network frequency and the 8.33 millisecond time constant for the monostable 24. This takes place when the average rate of the work pulses supplied by the converter 28 exceeds 36 H2.

In this case, assuming for example that the count C has a value equal to or greater than three at the end of the passage of a train of half-periods following the process described above, the input 39 of the AND gate 38 is excited; however the gate 38 can only become conductive after the gate 34. As indicated above, the bi-stable trigger 47 is in fact in its low state at the end of the above-mentioned train and it closes gate 38 for lack of excitation at the input 40 thereof.

Therefore, the synchronizing pulse corresponding to the first conductive half-period of a new train thus excites the monostable 24 via the gates 34 and 46, and, since the bi-stable trigger 47 has switched to its high state, the following synchronizing pulse passes through the gate thus opened and causes the excitation of the monostable 43, thereby producing at the output thereof a rectangular 29.16 signal of milliseconds. The presence of this signal at the input 26 of the monostable 24 ensures three successive re-starts thereof, each causing the passage, by firing the thyristors via the gates 20a, 20b and 20c, of two conductive half-periods.

The result of the above described sequence is the generation of a train having 8 consecutive conductive half periods, at the end of which, the state of the phase selector 55 is the same as if the train had only consisted of 2 conductive half-periods. Under these conduction, if for example the first conductive half-period of this long train were transmitted by the conductor 13a, the last is transmitted by the conductor 13b and renders conductive the AND gate 53c, so that, irrespective of the period of time passing between this last conductive half-period and the beginning of the following train, the initial half-period of this second train is transmitted by the conductor 13c, while the conductor 13a transmits the last half-period of said second train, whereafter the AND gate 53b becomes conductive so as to prepare the passage of the first conductive half-period of the following train by the conductor 13b, the last conductive half-period of this third train passing along the conductor 13c and rendering the AND gate 53a conductive, and so on.

If the rate frequency of the pulses supplied by the voltage-frequency converter 28 reaches 90 H2, a series of adjacent trains of eight conductive half-periods will be obtained, and the working rate of the thyristors will be equal to unity, this corresponding to the transmission of the maximum available power to the load 10.

It should be noted that the long train enabling signal delivered at the input 44 of gate 46 is synchronized by means not described with a synchronizing signal available at 37.

The above described apparatus makes it possible to effect inturn the firing of the thyristors in such manner as to deliver cycles of three trains of conductive half-periods, each comprising 2 or 8 consecutive conductive half-periods ($a = 2$, $b = 0$, or $a = 2$, $b = 2$).

It will of course be understood that it would only be necessary to modify the time-constants of the monostable triggers 24 and 43 in order to obtain, for special applications, trains comprising a different number of conductive half-periods. Similarly, the order of the conductors successively traversed by the first conductive half-periods of each train, which in the present case is 13a, 13c, 13b, 13a... only depends on the manner of associating the three outputs of the phase selector 55 with each of the gates 53a, 53b and 53c, and it could be chosen differently.

Finally, the modifications to be carried out on the above-described device in order that it may be associated with a polyphase alternating current network, the number of phases of which is other than three, will be obvious to those skilled in the art. For this purpose, it is only necessary for the number of the thyristors 14, the generators 18, the gates such as 20a, and the gates such as 53a, to be equal to the number of phase conductors of the network. Instead of associating a diode 15 with each of the thyristors 14, it would obviously be possible to replace these diode by thyristors. The principles of the invention remain valid, on the other hand, for all types of controlled valves.

What I claim is:

1. An apparatus for controlling electric power transmitted by a group of N phase conductors, N being an integer greater than TWO, for supplying a load with N-phase alternating current, comprising a thyristor in series with each one of said conductors and being made conductive during substantially full half-periods of said alternating current, means generating synchronizing pulses for each period of said alternating current at substantially zero crossings of the supply voltage of each phase conductor, switching means processing firing pulses derived from said synchronizing pulses so that said firing pulses render the corresponding thyristors conductive during substantially half periods of said alternating current, said switching means processing said firing pulses so as to produce conduction cycles consisting of N trains of conductive half-periods, each of said trains consisting of $a + Nb$ half-periods having the same sign, $a$ being an invariable positive whole number and $b$ a positive whole number or zero, the successive half-periods of each train being determined in response to consecutive synchronizing pulses, and phase selecting means causing the first half-period of a train of half-periods of said cycle to pass through each thyristor once and only once during the course of each of said cycles.

2. An apparatus as claimed in claim 1, wherein said phase selecting means applies to the thyristors initial firing pulses determining the first conductive half-period of the successive trains in each cycle, the thyristors successively fired by the successive initial firing pulses bieng in a cyclic permutation order opposite to the succession order defined by the increasing voltage phase lag of the corresponding phase conductors.

3. An apparatus as claimed in claim 1, further comprising means dividing into sub-ranges the total power control range of the apparatus, each of said sub-ranges corresponding to a respective value of said whole number $b$.

4. An apparatus as claimed in claim 1, said apparatus comprising a first gating means transmitting synchronizing pulses issuing from each phase conductor conditionally in order to fire a thyristor associated with said conductor, a first mono-stable circuit having low and high states and allowing in its high state the transmission of said synchronizing pulses by said first gating means, the time-constant of said mono-stable circuit being such that the transition of said mono-stable circuit to its high state enables said first gating means to transmit a train of $a$ consecutive synchronizing pulses causing the firing of the corresponding thyristors and the transmission by these thyristors of a corresponding train of $a$ consecutive conductive half-periods, a voltage-to-frequency frequency converter delivering power demand pulses, the frequency of which is an increasing function of a D.C. voltage adjustable between two pre-determined limits, a reversible counter counting additively the demand pulses supplied by said converter and subtractively the state changes of said monostable circuit from its low state to its high state, a second gating means transmitting conditionally to said mono-stable circuit an energizing pulse in response to an initiating synchronizing pulse derived from a sequentially selected one of the phase conductors, on condition that the count stored in said reversing counter equals at least ONE and that the synchronizing pulse immediately preceding said energizing pulse has not caused the corresponding thyristor to be fired, said phase selecting means comprising a phase selector adapted to transmit selectively to said second gating means a synchronizing pulse derived from one of said N sequentially selected phase conductors for each energizing pulse of said monostable circuit, as a function of the succession rank of the train of conductive half-periods initiated by said energizing pulse in the cycle to which said train belongs.

5. An apparatus as claimed in claim 4, wherein said phase selector comprises N inputs and N outputs respectively associated with said inputs, each of said inputs being connected to receive an excitation signal during the firing of a respective one of said thyristors, each of said outputs being connected to a first input of a respective AND gate having a second input for receiving the synchronizing pulses coming from a respective one of said N phase conductors, said phase selector having N different stable states, each one of which is initiated by the reception of said excitation signal by a respective one of said N inputs to cause a corresponding one of said AND gates to open, and wherein said initiating pulse is collected at the output of an OR gate having N inputs each connected to the output of a corresponding one of said AND gates.

6. An apparatus as claimed in claim 4, further comprising a second monostable circuit having low and high states, said second monostable circuit cooperating when in its high state with said first monostable circuit for allowing the passage through said first gating means of $a + Nb$ consecutive synchronizing pulses, where the whole number $b$ is equal to or greater than ONE, said second monostable circuit switching into its up state only when the count stored in said reversible counter is equal to or greater than a predetermined integer greater than ONE.

7. An apparatus as claimed in claim 6, further comprising a bistable trigger having low and high states, said bistable trigger being switched to its high state by the synchronizing pulses being passed through said first gating means and being switched to its low state by the synchronizing pulses not being passed through said first gating means, said bistable trigger being connected to said second gating means to prevent said second gating means from energizing said first monostable circuit device when said bistable trigger is in its high state, a third gating means delivering to said second monostable circuit an excitation pulse derived from said initiating synchronizing pulse on the condition that said bistable trigger is in its high state and that the count stored in said reversible counter is equal to or greater than said predetermined integer greater than ONE, said second monostable circuit being connected to said first monostable circuit to cause said first monostable circuit to be energized as long as said second monostable circuit remains in its high state.

8. An apparatus as claimed in claim 6, wherein N = 3, for controlling the power fed to a load through first, second and third phase conductors supplied with three-phase alternating current having a period T, said load being coupled in delta to said first, second and third conductors through respective first, second and third thyristors, wherein the time-constant of said first monostable circuit lies strictly between $T/3$ and $2T/3$.

9. An apparatus as claimed in claim 8, wherein said phase selector has three stable states respectively initiated by the firing of the first, second and third thyristors so as to cause respectively first, second and third AND gates to open, said first inputs of said first, second and third AND gates receiving respectively the synchronizing pulses derived from said second, third and first phase conductors.

10. An apparatus as claimed in claim 7, in which the time-constant of said second monostable circuit enables said second monostable circuit to cause three consecutive re-energizations of said first monostable circuit.

* * * * *